(12) United States Patent
Sugimoto (10) Patent No.: US 11,057,239 B2
(45) Date of Patent: Jul. 6, 2021

(54) VEHICULAR NETWORK DEVICE

(71) Applicant: Yazaki Corporation, Tokyo (JP)

(72) Inventor: Terumitsu Sugimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 29 days.

(21) Appl. No.: 16/121,061

(22) Filed: Sep. 4, 2018

(65) Prior Publication Data

US 2019/0089555 A1   Mar. 21, 2019

(30) Foreign Application Priority Data

Sep. 15, 2017   (JP) .............................. JP2017-177604

(51) Int. Cl.
| | |
|---|---|
| *H04L 12/40* | (2006.01) |
| *H04L 29/06* | (2006.01) |
| *H04W 4/48* | (2018.01) |
| *H04W 12/086* | (2021.01) |
| *H04B 3/36* | (2006.01) |

(Continued)

(52) U.S. Cl.
CPC ............... *H04L 12/40* (2013.01); *H04B 3/36* (2013.01); *H04L 12/66* (2013.01); *H04L 41/0806* (2013.01); *H04L 63/02* (2013.01); *H04L 67/12* (2013.01); *H04L 69/14* (2013.01); *H04W 4/48* (2018.02); *H04W 12/086* (2021.01); *H04L 45/121* (2013.01); *H04L 2012/40215* (2013.01)

(58) Field of Classification Search
CPC ......... H04L 12/40; H04L 63/02; H04L 69/14; H04L 67/12; H04L 41/0806; H04L 12/66; H04L 45/121; H04L 2012/40215; H04L 12/40182; H04L 12/4625; H04W 4/48; H04W 12/0806; H04B 3/36
See application file for complete search history.

(56) References Cited

U.S. PATENT DOCUMENTS

| | | | |
|---|---|---|---|
| 2003/0076221 A1* | 4/2003 | Akiyama | .......... H04L 12/40182 340/12.32 |
| 2011/0085547 A1 | 4/2011 | Takada et al. | |

(Continued)

FOREIGN PATENT DOCUMENTS

| | | |
|---|---|---|
| JP | 2010-21806 A | 1/2010 |
| JP | 2015-67187 A | 4/2015 |

(Continued)

*Primary Examiner* — Jackie Zuniga Abad
(74) *Attorney, Agent, or Firm* — Sughrue Mion, PLLC (57) ABSTRACT

Two communication ECUs which can be disposed in different areas on a vehicle are equipped with respective communication relays which are connected to each other by an interarea connection unit. The functions of each of the communication relays are simplified and separated from the functions of a router. When receiving a signal, the communication relays outputs the signal to another, belonging to the same system as the communication line from which the signal has been received, of communication lines and to the router. The router controls a route of a signal to be transmitted between different systems of communication lines that are one of the communication lines and one of the communication lines. Since the communication relays are low in cost and can operate at high speed and the number of routers is decreased, the components cost can be lowered.

6 Claims, 6 Drawing Sheets

(51) Int. Cl.
*H04L 12/66* (2006.01)
*H04L 12/24* (2006.01)
*H04L 29/08* (2006.01)
*H04L 12/727* (2013.01)

(56) References Cited

U.S. PATENT DOCUMENTS

2017/0008464 A1* 1/2017 Kikuchi .................. H04L 67/12
2018/0141439 A1* 5/2018 Shin ...................... B60L 3/0084
2018/0183626 A1* 6/2018 Ishizuka ............. H04L 12/4625
2019/0068407 A1* 2/2019 Haga ................ H04L 12/40006

FOREIGN PATENT DOCUMENTS

| | | |
|---|---|---|
| JP | 2015-139093 A | 7/2015 |
| JP | 2017-19329 A | 1/2017 |

* cited by examiner

| SYSTEM | RISK | AMOUNT OF COMMUNICATION DATA |
|---|---|---|
| DRIVE ASSIST SYSTEM | HIGH | LARGE |
| WHEEL DRIVE SYSTEM | HIGH | MEDIUM |
| ELECTRIC POWER SYSTEM | HIGH TO LOW | |
| BODY SYSTEM | MEDIUM | |
| INFORMATION SYSTEM | LOW | LARGE |
| EXTERNAL CONNECTION SYSTEM | LOW | LARGE |

VEHICULAR NETWORK DEVICE

CROSS REFERENCE TO RELATED APPLICATIONS

This application is based on and claims priority from Japanese patent application No. 2017-177604 filed on Sep. 15, 2017, the entire contents of which are incorporated herein by reference.

BACKGROUND OF THE INVENTION

1. Technical Field

The present invention relates to a vehicular network device and, more particularly, to a technique for allowing various devices on a vehicle to communicate with each other.

2. Background Art

In vehicles, in general, a number of various electric devices are arranged at various locations. And to control one or plural electric devices in proper manners, an electronic control unit (ECU) incorporating a microcomputer is provided for, for example, each function.

Furthermore, for example, it is necessary to allow various ECUs disposed on a vehicle to share the same information and acquire necessary information and to allow the operation state of each ECU to be recognize by other ECUs. To these ends, a number of ECUs that are different from each other in function or type are connected to each other by a network so as to be able to communicate with each other on the same vehicle (refer to Patent documents JP-A-2015-67187 and JP-A-2017-19329).

For example, Patent document JP-A-2015-67187, which relates to a vehicle control system, discloses a technique for shortening wiring lengths and facilitating wiring work. This vehicle control system is equipped with plural functional ECUs that are arranged at plural different regions of a vehicle and classified into plural groups by the function of a functional unit as a control target, plural relay ECUs arranged at the respective regions, a first network which connects the plural relay ECUs to each other, and second networks each of which is disposed in each region and connects functional ECUs to a relay ECU in the region.

Patent document JP-A-2017-19329, which relates to a communication system, discloses a technique for enabling a communication between devices even if they have different protocols and shortening the lengths of electric wires. This communication system is equipped with plural gateway units each of which is disposed in each section of a vehicle and can communicate with plural devices having different protocols and a trunk line which connects the individual sections to each other.

SUMMARY

In vehicular networks as described above which realize communication between ECUs, as disclosed in, for example, Patent document JP-A-2015-67187, various ECUs are classified into plural groups by the function of a functional unit as a control target. Such classification into groups is made in consideration of the following factors:

(1) The components cost of a system can be reduced if plural ECUs that are similar in necessary communication rate are assigned to the same group and connected to a common communication line.

(2) The amount of bypass information to pass through a gateway can be reduced if plural ECUs that realize related functions are assigned to the same group and connected to a common communication line. A plausible manner of implementation would be to group ECUs by the function into, for example, a vehicle body group, a power train group, a drive assist group, a multimedia group, etc.

(3) Another plausible manner of implementation would be to group ECUs taking into consideration differences in the secrecy of information to be transmitted and the degree of risk of a vehicle accident caused by a malfunction of a device.

(4) A further plausible manner of implementation would be to assign ECUs located near each other on a vehicle body to the same group and assign ECUs that are distant from each other to different groups. This makes it possible to shorten communication line lengths of a wire harness and lower the components cost and weight. For example, it is conceivable to form different groups for respective areas such as areas in the vicinities of vehicle bumpers, an engine compartment area, an instrument panel area, door areas, a roof area, a seat area, and a luggage room area.

However, since the manners of optimization of grouping described in items (1)-(4) have different purposes, the result of optimization, that is, the network configuration, varies depending on which of items (1)-(4) importance is attached to. Which of items (1)-(4) is desired as an item to which importance is attached would vary depending on the situation.

Incidentally, a communication line such as a trunk line that connects plural areas that are distant from each other are required to transmit a large amount of information at high speed. Furthermore, since different systems of signal lines that are classified into plural groups exist in each area of a network system, a router for controlling a route of a signal such as frames of the CAN (Controller Area Network) standard needs to be disposed at a location of connection of plural areas on a network. However, since a router that is compatible with high-speed communication and can perform complicated controls is very expensive, the cost of a network of the entire vehicle increases if routers are installed in respective areas. On the other hand, if the processing speeds of routers are slow, a signal is delayed in a router when it goes from one area to another even if it is transmitted by signal lines of the same system, making it difficult to satisfy a specification required for the vehicle.

The present invention has been made in view of the above circumstances, and an object of the invention is therefore to provide a vehicular network device capable of shortening a delay time of a communication that uses plural systems of communication lines.

To attain the above object, the invention provides vehicular network devices of the following items (1) to (5):

(1) A vehicular network device installed on a vehicle, comprising:
a communication relay which is connected to at least two sets of plural communication lines; and
a router which controls a communication route of a signal to pass through the communication relay,
wherein the plural communication lines belong to respective predetermined systems and are independent of each other;
wherein when receiving a signal from a communication line of one of the at least two sets of plural communication lines, the communication relay sends the signal to a communication line, belonging to the same system as the communication line from which the signal has been received, of another set of plural communication lines and to the router; and wherein the router sends the signal to a communication line, belonging to a different system than the communication line from which the signal has been received, of the other set of plural communication lines.

(2) A vehicular network device, comprising:

plural communication relays which can be disposed in different areas on a vehicle;

a router which controls a communication route of a signal to pass through two of the plural communication relays; and an interarea connection unit or units each of which connects two of the plural communication relays to each other and one of the plural communication relays and the router to each other by a communication line; and device connection units which are connected to the plural respective communication relays and each of which has plural communication lines, wherein the plural communication lines belong to respective predetermined systems and are independent of each other;

wherein the communication line of each interarea connection unit has transmission lines which are independent of each other and belong to respective systems that are at least equal in number as the plural communication lines;

wherein when receiving a signal, each of the plural communication relays outputs the signal to one, belonging to the same system as the communication line from which the signal has been received, of the transmission lines and to the router; and wherein the router sends the signal to one, belonging to a different system than the communication line from which the signal has been received, of the transmission lines.

(3) The vehicular network device according to item (2), wherein the plural communication relays are disposed in respective spaces in the vehicle that are provided with respective vehicle portions having different functions and are independent of each other.

(4) The vehicular network device according to item (2), further comprising a trunk line capable of higher speed communication than the plural communication lines of each of the device connection units, wherein:

the trunk line includes transmission lines that are at least equal in number as the plural communication lines of each of the device connection units.

(5) The vehicular network device according to item (2), further comprising a device which manages communication security and is disposed between at least one of the plural communication relays and a communication line, belonging to one system, of the associated device connection unit.

According to the vehicular network device having the configuration of item (1), since the operation of the communication relay is very simple, the communication delay time can be shortened when a signal that is received from a communication line of one system is sent to another communication line of the same system via the communication relay.

According to the vehicular network device having the configuration of item (2), since the operation of each of the plural communication relays is very simple, each communication relay capable of high-speed operation can be realized by merely using dedicated hardware that is simple in configuration and inexpensive. Furthermore, a route of a signal to be transmitted between signal lines of different systems can be controlled by merely using a single router. Thus, the configuration of the overall system is simplified. As a result, high-speed operation can be realized and a communication delay time can be shortened while increase of the components cost is suppressed.

According to the vehicular network device having the configuration of item (3), a communication network that connects portions of a vehicle to each other can be constructed easily and a communication between portions located in different areas can be performed at high speed by disposing communication relays in, for example, respective areas such as areas in the vicinities of vehicle bumpers, an engine compartment area, an instrument panel area, door areas, a roof area, a seat area, and a luggage room area.

According to the vehicular network device having the configuration of item (4), since the trunk line capable of high-speed communication is used as the interarea connection unit, the communication delay time can be shortened even between distant areas. Furthermore, since transmission lines that are at least equal in number to the plural systems of communication lines are formed in the single trunk line, it is not necessary to provide each communication relay with a function of switching the input/output connection relationship. Thus, communication routes of a network on a vehicle can be controlled by only a single router.

According to the vehicular network device having the configuration of item (5), by using a communication route that passes through the device for managing communication security, communication security can be secured even in performing a communication between a device on a vehicle and an indefinite device outside the vehicle.

The vehicular network device according to the invention makes it possible to suppress increase of the cost of components such as a router and to perform a high-speed communication between plural areas. That is, since router functions need not be provided at plural locations and the operation of each communication router is simple, high-speed operation can be realized without using expensive components.

The invention has been described above concisely. The details of the invention will become more apparent when the modes for carrying out the invention (hereinafter referred to as an embodiment) described below are read through with reference to the accompanying drawings.

DETAILED DESCRIPTION OF EMBODIMENTS

A specific embodiment of the present invention will be hereinafter described with reference to the drawings.

Example Configuration-1 of Vehicular Network Device

Figure 1:
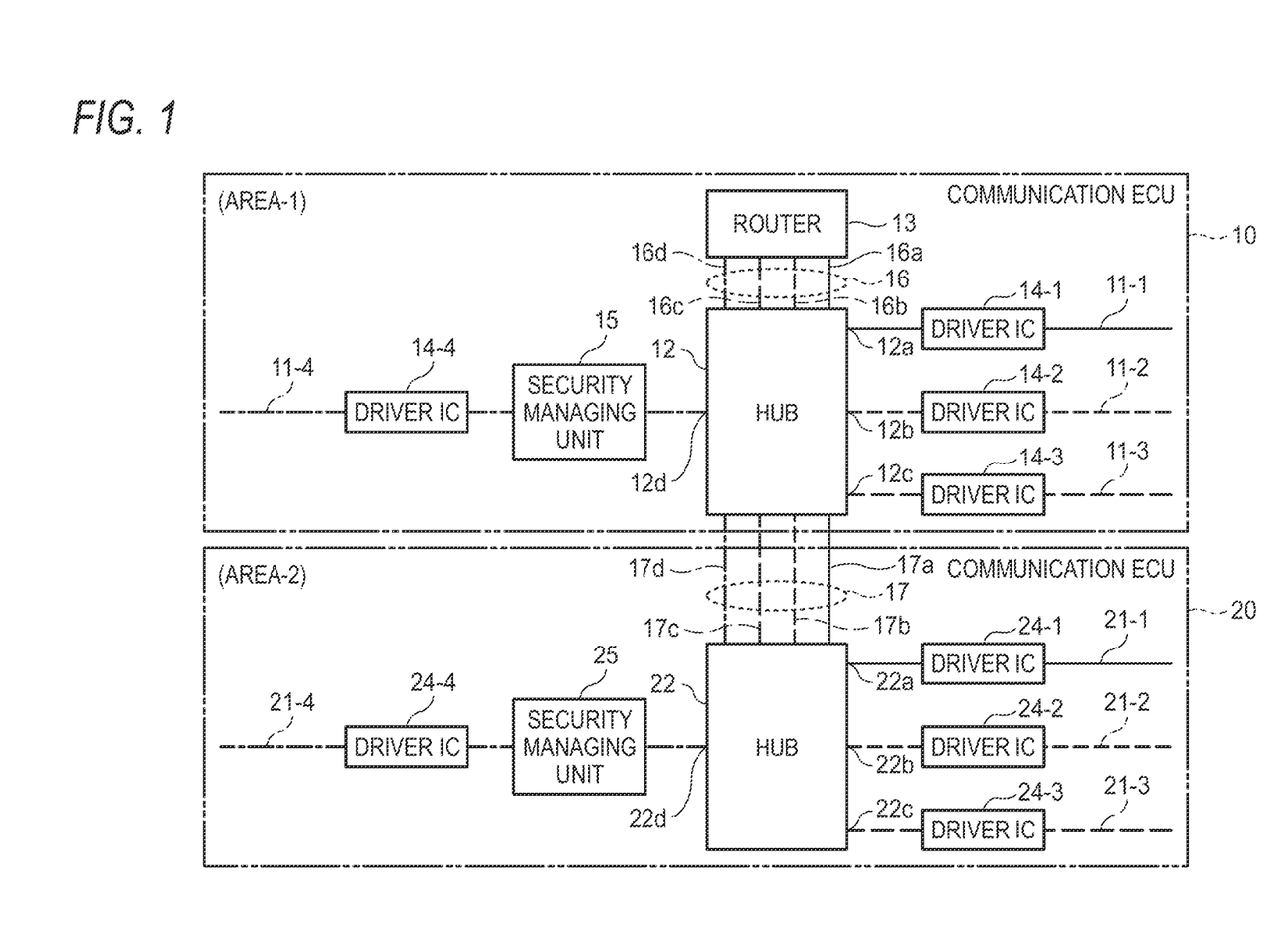
FIG. 1 is a block diagram showing a vehicular network device having example configuration-1.

FIG. 1 shows a vehicular network device having example configuration-1.

The vehicular network device shown in FIG. 1 is composed of two communication ECUs 10 and 20 and an interarea connection unit 17 which connects them. The communication ECUs 10 and 20 are disposed in area-1 and area-2 on a vehicle, respectively.

The communication ECU 10 has a function for enabling a communication between different systems of communication lines 11-1, 11-2, 11-3, and 11-4 which are independent of each other and the communication ECU 20. Each of the communication lines 11-1, 11-2, and 11-3 has a bus function for allowing connection of various vehicular devices (ECUs etc.) having a communication function. Thus, the number of vehicular devices that can be connected to each of the communication lines 11-1, 11-2, and 11-3 can be changed as necessary. The different systems of communication lines 11-1, 11-2, and 11-3 may be different from each other in, for example, the design specification such as a communication speed, the communication protocol, etc.

The communication line 11-4 has a function for enabling communication between a device outside the vehicle and a vehicular device. Thus, to perform a communication using the communication line 11-4, a function for securing communication safety should be provided. Each of the communication lines 11-1, 11-2, 11-3, and 11-4 is composed of two electric wires in the case where its design specification is compatible with the CAN (Controller Area Network) standard, for example.

The communication ECU 10 shown in FIG. 1 is equipped with a communication relay 12, a router 13, driver ICs (integrated circuits) 14-1 to 14-4, and a security managing unit 15. The communication relay 12 and the router 13 are connected to each other by a router connection unit 16. The communication lines 11-1, 11-2, 11-3, and 11-4 are connected to input/output ports 12a, 12b, 12c, and 12d of the communication relay 12 via driver ICs 14-1, 14-2, 14-3, and 14-4, respectively. The security managing unit 15 is connected between the input/output port 12d and the driver IC 14-4.

The communication relay 12 has only a hub function of simply relaying a communication in the same area or between different areas in such a manner that it remains the same in the system kind and the communication specification. That is, in the communication ECU 10 shown in FIG. 1 which includes the four systems of communication lines 11-1 to 11-4, the communication relay 12 relays four systems of communications independently of each other. The interarea connection unit 17 which connects the communication relay 12 and the communication ECU 20 includes four systems of communication lines corresponding to the respective communication lines 11-1 to 11-4 so as to be able to relay, independently of each other, communications being transmitted by the communication lines 11-1 to 11-4.

On the other hand, vehicular networks require a function of relaying a communication between systems that are different from each other in the system kind or the communication specification. For example, there may occur a case that a communication between a vehicular device connected to the communication line 11-1 and a vehicular device connected to the communication line 11-3 are necessary. To enable such a communication between different systems, the communication ECU 10 is equipped with the router 13 in addition to the communication relay 12.

That is, the router 13 has a route control function of, for example, switching the destination of a signal transmitted from one of the communication lines 11-1 to 11-4 to another, different in the system kind, of the communication lines 11-1 to 11-4 when necessary. The router 13 also has a gateway (GW) function of enabling a communication between different systems by absorbing, for example, differences in the communication protocol or other standard items.

The driver ICs 14-1 to 14-4 perform pieces of signal processing that are suitable for communication standards of the respective systems to which the communication lines 11-1 to 11-4 belong. That is, each of the driver ICs 14-1 to 14-4 incorporates a receiving unit and a transmission unit that perform amplification, waveform shaping, and other processing on a signal being input or output according to a communication standard.

The router connection unit 16 which connects the communication relay 12 and the router 13 is equipped with independent communication lines that are the same in the number (four) as the communication lines 11-1 to 11-4. Thus, the router connection unit 16 can receive signals from the respective communication lines 11-1 to 11-4 and output signals to the respective communication lines 11-1 to 11-4. These signals are relayed by the communication relay 12.

On the other hand, four systems of communication lines 21-1 to 21-4 are connected to the communication ECU 20 which is disposed in area-2. The communication lines 21-1 to 21-4 correspond to the respective communication lines 11-1 to 11-4 which are disposed in area-1.

That is, the communication lines 21-1 and 11-1 are the same in the communication protocol and the communication standard. Likewise, the communication lines 21-2 and 11-2 are the same in the communication protocol and the communication standard, the communication lines 21-3 and 11-3 are the same in the communication protocol and the communication standard, and the communication lines 21-4 and 11-4 are the same in the communication protocol and the communication standard. Thus, a vehicular device can be connected to either of, for example, the communication lines 11-1 and 21-1 which are of the same system and are the same in the system kind as the vehicular device. In actuality, since the communication ECU 10 and the communication ECU 20 are disposed in different areas, a vehicular device is connected to a closer one or a favorable one of, for example, the communication lines 11-1 and 21-1 which are of the same system and are the same in the system kind as the vehicular device. The communication line 21-4 is used for connection to a device outside the vehicle like the communication line 11-4 which is the same in system as the communication line 21-4.

The communication ECU 20 shown in FIG. 1 is equipped with a communication relay 22, four systems of driver ICs 24-1 to 24-4, and a security managing unit 25. That is, the communication ECU 20 is the same as the communication ECU 10 except that the former is not equipped with a router.

The communication relay 22 has a function for relaying communications between the communication lines 21-1 to 21-4 and the communication lines 11-1 to 11-4 in such a manner that they remain the same in system. Input/output ports 22a, 22b, 22c, and 22d of the communication relay 22 receive and output signals from and to the communication lines 21-1 to 21-4. The input/output ports 22a, 22b, and 22c are connected to the communication lines 21-1 to 21-3 via the driver ICs 24-1 to 24-3, respectively. The input/output port 22d is connected to the communication line 21-4 via the security managing unit 25 and the driver IC 24-4.

<Outline of Relay Operation>
<Functions of Communication Relay 12>

When receiving a signal from the communication line 11-1 at the input/output port 12a, the communication relay 12 in area-1 sends, as it is, the same information as carried by the received signal to the communication line 17a of the same system of the interarea connection unit 17 and to the communication line 16a of the same system of the router connection unit 16.

Likewise, when receiving a signal from the communication line 11-2 at the input/output port 12b, the communication relay 12 sends, as it is, the same information as carried by the received signal to the communication line 17b of the same system of the interarea connection unit 17 and to the communication line 16b of the same system of the router connection unit 16.

When receiving a signal from the communication line 11-3 at the input/output port 12c, the communication relay 12 sends, as it is, the same information as carried by the received signal to the communication line 17c of the same system of the interarea connection unit 17 and to the communication line 16c of the same system of the router connection unit 16. When receiving a signal from the communication line 11-4 at the input/output port 12d, the communication relay 12 sends, as it is, the same information as carried by the received signal to the communication line 17d of the same system of the interarea connection unit 17 and to the communication line 16d of the same system of the router connection unit 16.

When receiving a signal from the first-system communication line 17a of the interarea connection unit 17, the communication relay 12 sends the same information as carried by the received signal to the communication line 11-1 from the input/output port 12a of the same system and to the communication line 16a of the same system.

Likewise, when receiving a signal from the second-system communication line 17b of the interarea connection unit 17, the communication relay 12 sends the same information as carried by the received signal to the communication line 11-2 from the input/output port 12b of the same system and to the communication line 16b of the same system.

When receiving a signal from the third-system communication line 17c of the interarea connection unit 17, the communication relay 12 sends the same information as carried by the received signal to the communication line 11-3 from the input/output port 12c of the same system and to the communication line 16c of the same system. When receiving a signal from the fourth-system communication line 17d of the interarea connection unit 17, the communication relay 12 sends the same information as carried by the received signal to the communication line 11-4 from the input/output port 12d of the same system and to the communication line 16d of the same system.

<Functions of Communication Relay 22>

When receiving a signal from the communication line 21-1 at the input/output port 22a, the communication relay 22 in area-2 sends, as it is, the same information as carried by the received signal to the communication line 17a of the same system of the interarea connection unit 17. Likewise, when receiving a signal from the communication line 21-2 at the input/output port 22b, the communication relay 22 sends, as it is, the same information as carried by the received signal to the communication line 17b of the same system of the interarea connection unit 17.

When receiving a signal from the communication line 21-3 at the input/output port 22c, the communication relay 22 sends, as it is, the same information as carried by the received signal to the communication line 17c of the same system of the interarea connection unit 17. When receiving a signal from the communication line 21-4 at the input/output port 22d, the communication relay 22 sends, as it is, the same information as carried by the received signal to the communication line 17d of the same system of the interarea connection unit 17.

When receiving a signal from the first-system communication line 17a of the interarea connection unit 17, the communication relay 12 sends the same information as carried by the received signal to the communication line 21-1 from the input/output port 22a of the same system. Likewise, when receiving a signal from the second-system communication line 17b of the interarea connection unit 17, the communication relay 12 sends the same information as carried by the received signal to the communication line 21-2 from the input/output port 22b of the same system.

When receiving a signal from the third-system communication line 17c of the interarea connection unit 17, the communication relay 12 sends the same information as carried by the received signal to the communication line 21-3 from the input/output port 22c of the same system. When receiving a signal from the fourth-system communication line 17d of the interarea connection unit 17, the communication relay 12 sends the same information as carried by the received signal to the communication line 21-4 from the input/output port 22d of the same system.

<Overall Relay Operation>

As seen from the above description, where the function of the router 13 is not used, the communication relays 12 and 22 operate so as to allow communication, through relaying, of a signal only between communication lines, belonging to the same system, in plural areas.

For example, when a signal is input to the input/output port 12a of the communication relay 12 from the communication line 11-1 via the driver IC 14-1, this signal is sent to the communication line 21-1 via the communication relay 12, the communication line 17a, the communication relay 22, and the driver IC 24-1. Likewise, when a signal is input to the input/output port 12b of the communication relay 12 from the communication line 11-2 via the driver IC 14-2, this signal is sent to the communication line 21-2 via the communication relay 12, the communication line 17b, the communication relay 22, and the driver IC 24-2.

When a signal is input to the input/output port 12c of the communication relay 12 from the communication line 11-3 via the driver IC 14-3, this signal is sent to the communication line 21-3 via the communication relay 12, the communication line 17c, the communication relay 22, and the driver IC 24-3. When a signal is input to the input/output port 12d of the communication relay 12 from the communication line 11-4 via the driver IC 14-4, this signal is sent to the communication line 21-4 via the communication relay 12, the communication line 17d, the communication relay 22, and the driver IC 24-4.

When a signal is input to the input/output port 22a of the communication relay 22 from the communication line 21-1 via the driver IC 24-1, this signal is sent to the communication line 11-1 via the communication relay 22, the communication line 17a, the communication relay 12, and the driver IC 14-1. Likewise, when a signal is input to the input/output port 22b from the communication line 21-2, this signal is sent to the communication line 11-2 via the communication relay 22, the communication line 17b, the communication relay 12, and the driver IC 14-2.

When a signal is input to the input/output port 22c of the communication relay 22 from the communication line 21-3 via the driver IC 24-3, this signal is sent to the communication line 11-3 via the communication relay 22, the communication line 17c, the communication relay 12, and the driver IC 14-3. When a signal is input to the input/output port 22d from the communication line 21-4, this signal is sent to the communication line 11-4 via the communication relay 22, the communication line 17d, the communication relay 12, and the driver IC 14-4.

With the above operations, when a communication is performed between devices (e.g., plural ECUs) that are connected to communication lines belonging to the same system, usually the delay of relaying of the signal is suppressed because the communication relays 12 and 22 need not take out destination-indicative information from the signal. Where a communication needs to be performed between different kinds of systems, a communication route including plural communication lines belonging to different systems is established as necessary by the function of the router 13.

For example, the router 13 can send the same information as carried by a signal that is input to the first communication line 16a of the router connection unit 16 to any of the second to fourth communication lines 16b-16d. Thus, a signal that is received from the communication line 11-1 in area-1 can be sent to a selected one of the communication lines 11-2 to 11-4 and 21-2 to 21-4 belonging to the different systems than the communication line 11-1 does.

However, since communication lines belonging to different systems may be different from each other in the communication protocol or the communication standard, a function for absorbing such a difference in the communication protocol or the communication standard is necessary in performing a communication between different systems; the router 13 is provided with that function. That is, the communication ECU 10 which is equipped with the router 13 includes a gateway function that enables a communication using plural communication lines belonging to different systems. In the configuration shown in FIG. 1 in which the single router 13 can control the entire network installed in the vehicle, it suffices that the router 13 be provided only in the single communication ECU 10 having the gateway function.

<Sets of Characteristics of Respective Systems of Communication Lines>

Figure 2:
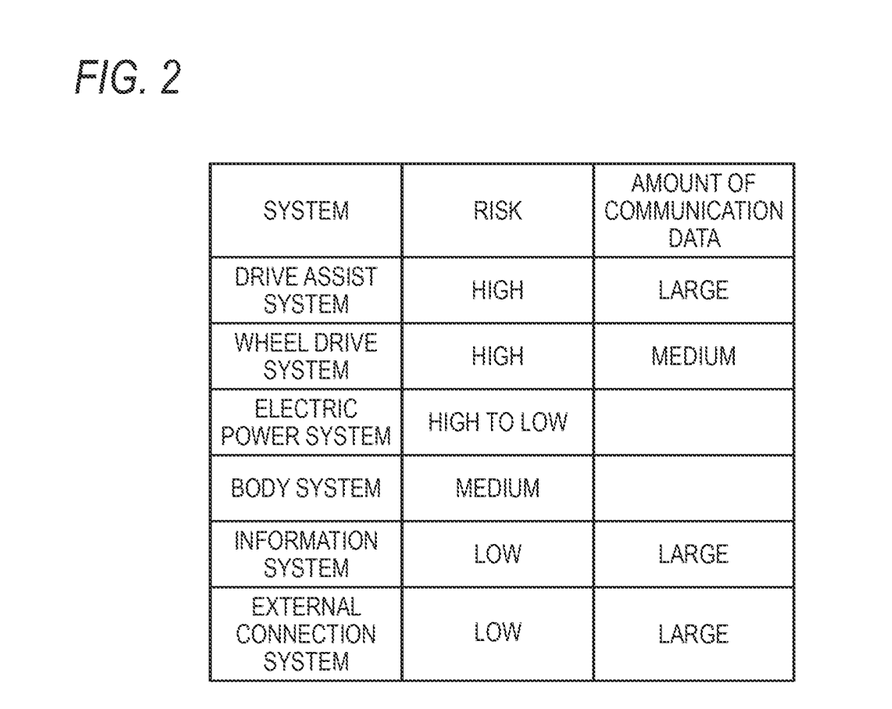
FIG. 2 is a table showing tendencies of characteristics of respective systems (groups) of communication lines installed on a vehicle.

FIG. 2 shows tendencies of characteristics of respective systems (groups) of communication lines installed on a vehicle. The example shown in FIG. 2 is of a case that various vehicular devices (electric devices such as ECUs) installed in a vehicle are classified by the function into six systems, that is, a drive assist system, a wheel drive system, an electric power system, a body system, an information system, and an external connection system.

The term "risk" in FIG. 2 means the degree of influence of an erroneous operation, for example, of a device concerned. "High risk" means a high probability of occurrence of a traffic accident, "medium risk" means a relatively high probability of occurrence of a traffic accident, and "low risk" means a state that a user would feel inconvenient.

Although the example of FIG. 2 is of the case that communication lines are classified into six systems, the number of systems can be decreased by combining some of the systems into one group. For example, since in the example of FIG. 2 the drive assist system and the wheel drive system are two systems that are similar in risk and the amount of communication data, they may be combined into the same group. Likewise, the electric power system and the body system are two systems that are similar in risk and the amount of communication data and hence may be combined into one group. Furthermore, the information system and the external connection system may also be classified into one group.

The communication specifications of the four systems of communication lines 11-1 to 11-4 and the four systems of communication lines 21-1 to 21-4 that constitute the network can be optimized by determining how to assign vehicular devices to communication lines belonging to respective systems taking similarities in various aspects into consideration as in the above-described manner.

For example, in the vehicular network device shown in FIG. 1, since it is equipped with the four systems of communication lines 11-1 to 11-4 and the four systems of communication lines 21-1 to 21-4, it is conceivable to combine parts of the six systems of communication lines shown in FIG. 2. For example, vehicular devices of the drive support system and the wheel drive system are connected to the first-system communication line 11-1 or 21-1. Vehicular devices of the electric power system and the body system are connected to the second-system communication line 11-2 or 21-2. Vehicular devices of the information system are connected to the third-system communication line 11-3 or 21-3. Vehicular devices of the external connection system, which require security management, are connected to the fourth-system communication line 11-4 or 21-4.

<Functions of Router 13>

Figure 3:
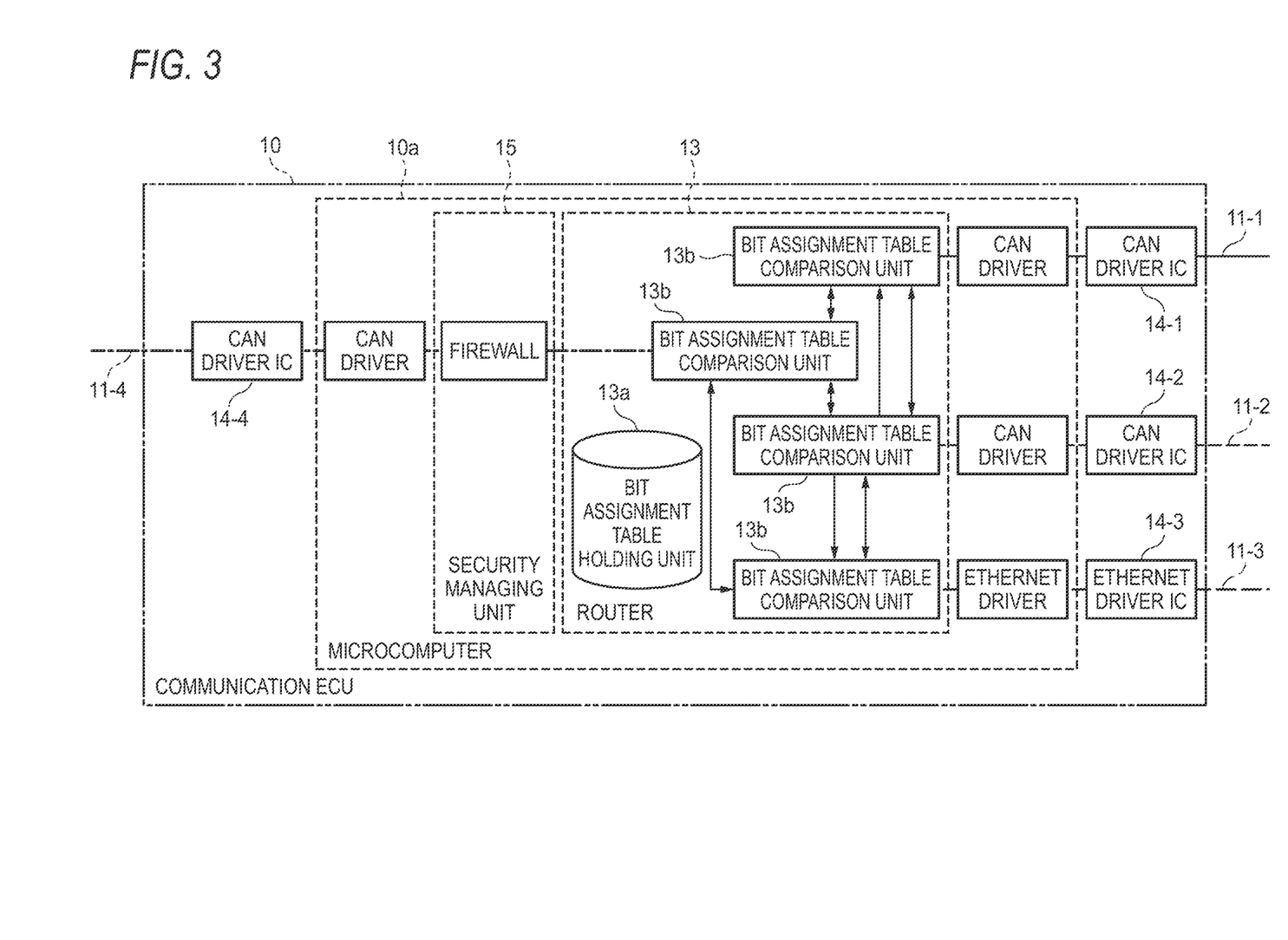
FIG. 3 is a block diagram showing the configuration of a communication ECU excluding a communication relay.

FIG. 3 shows the configuration of the communication ECU 10 excluding the communication relay 12. The example of FIG. 3 assumes that the communication lines 11-1, 11-2, and 11-4 are designed so as to be compatible with the CAN communication standard and the communication line 11-3 is designed so as to compatible with the Ethernet (registered trademark) communication standard.

The communication ECU 10 shown in FIG. 3 is equipped with a microcomputer 10a, CAN driver ICs 14-1, 14-2, and 14-4, and an Ethernet driver IC 14-3. The microcomputer 10a is provided with functions of the security managing unit 15, the router 13, and drivers of the respective systems.

The security managing unit 15 is provided with a firewall function and a function for encrypted communication. The router 13 is provided with a function of a bit assignment table holding unit 13a and a function of bit assignment table comparison units 13b. The bit assignment table shows manners of assignment of pieces of information to respective communication bits that are necessary to perform processing relating to a communication protocol corresponding to each of plural kinds of communication standards with which each of the systems to which the communication lines 11-1 to 11-4 etc. belong are compatible.

The router 13 can establish a communication route for communication between different systems. For example, the router 13 can send a signal received from a vehicular device connected to the communication line 11-1 to a communication line 11-3 belonging to another system. However, in the example of FIG. 3, since the communication standards of the communication lines 11-1 and 11-3 are CAN and Ethernet, respectively, the router 13 needs to absorb differences between those standards.

To this end, referring to the bit assignment table of the bit assignment table holding unit 13a, the router 13 recognizes manners of assignment of pieces of information to respective bits in communication standards of a transmission source and destination and absorbs differences between communication protocols or, if necessary, performs data conversion, through processing of the bit assignment table comparison units 13b.

(Advantages of Vehicular Network Device)

In the vehicular network device shown in FIG. 1, the communication relays 12 and 22 which are provided inside the respective communication ECUs 10 and 20 which are installed in the respective areas are connected to each other by the interarea connection unit 17, whereby a communication between the different areas is enabled. Since each of the communication relays 12 and 22 is not required to perform operations other than an operation of the simple relay function, they can realize high-speed communication by employing only inexpensive hardware components. Thus, the transmission delay time of a communication along a route that passes through the plural areas can be shortened. Even where the communication ECUs 10 and 20 are disposed in different areas, only one router 13 is necessary to perform a communication between ones, belonging to different systems, of the communication lines 11-1 to 11-4 and 21-1 to 21-4. The components cost of the overall network can therefore be reduced to a large extent.

Modification

Example Configuration-2 of Vehicular Network Device

Figure 4:
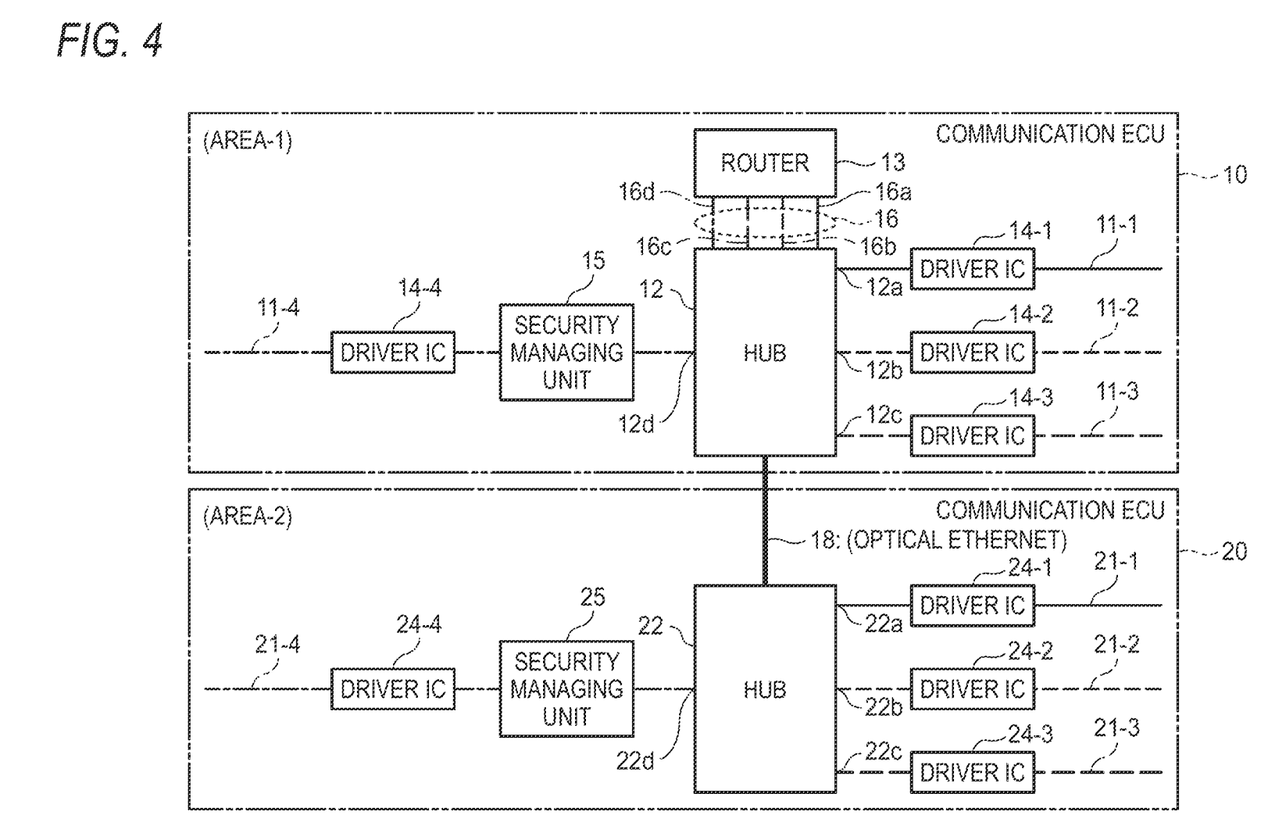
FIG. 4 is a block diagram showing a vehicular network device having example configuration-2.

FIG. 4 shows a vehicular network device having example configuration-2 which is a modification of example configuration-1 shown in FIG. 1. Example configuration-2 is different from example configuration-1 in that an optical connection trunk line 18 is employed at the location where the communication relay 12 and the communication relay 22 are connected to each other.

It is expected that communication lines for connection between different areas on a vehicle, such as the interarea connection unit 17 shown in FIG. 1 and the optical connection trunk line 18 shown in FIG. 4, serve to exchange a large amount of data. Furthermore, it is highly probable that an allowable communication delay time is set very short in a vehicle-side specification.

It is therefore necessary to make high the speed of communication between the communication ECUs 10 and 20 for connecting different areas and the speed of processing performed in each of the communication ECUs 10 and 20. Connecting the communication ECUs 10 and 20 by the optical connection trunk line 18 as in the configuration shown in FIG. 4 enables high-speed communication and hence transmission of a large amount of data. That is, since a data communication is performed using an optical signal, the bit rate can be increased by setting the communication frequency higher. It is conceivable to perform a communication through the optical connection trunk line 18 in the form of an optical communication according to, for example, the Ethernet standard.

<Example Structure Involving Transmission Lines>

Figure 5:
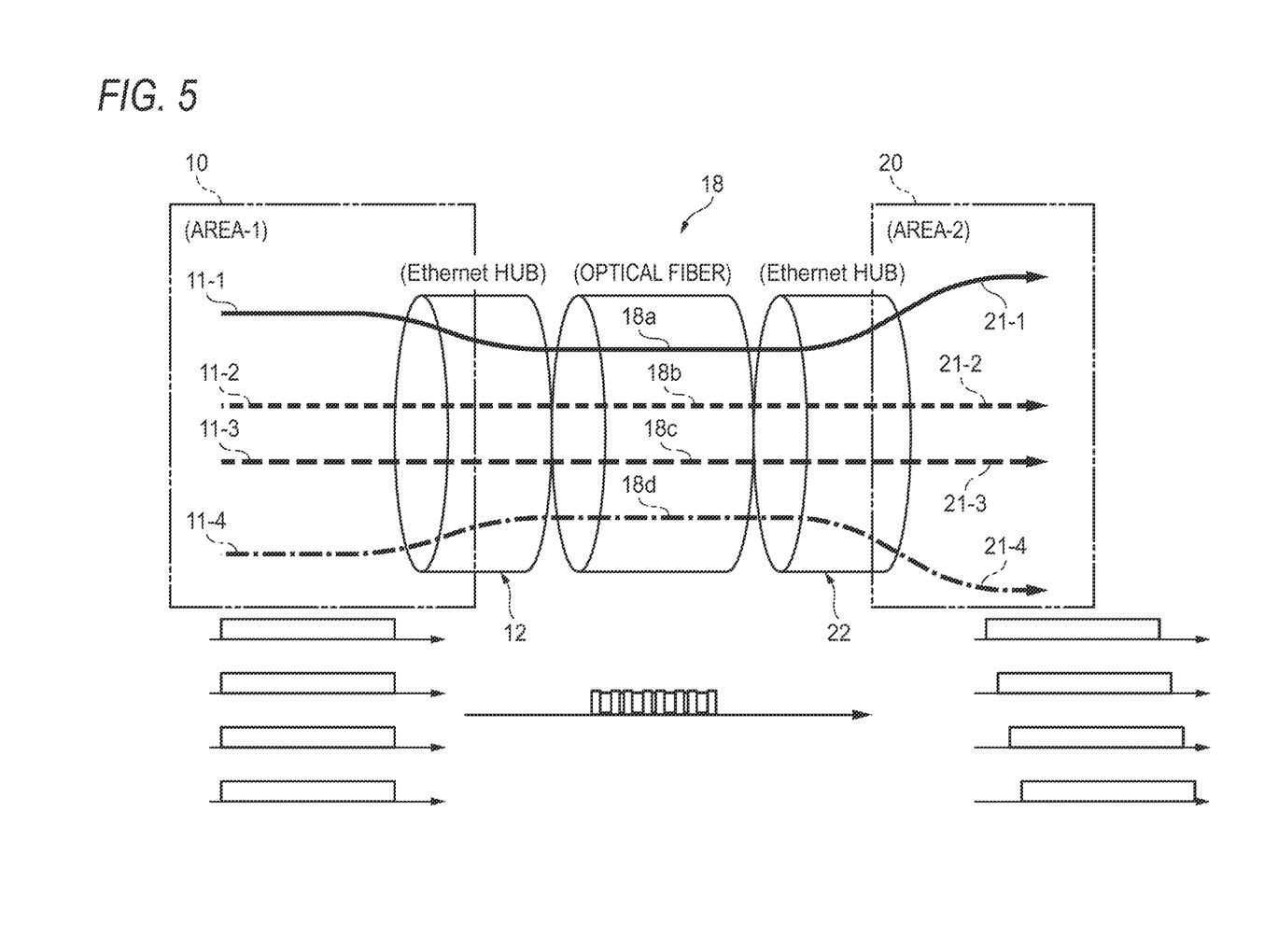
FIG. 5 is a schematic diagram illustrating an example structure involving transmission lines in the vehicular network device shown in FIG. 4.

FIG. 5 shows an example structure involving transmission lines in the vehicular network device shown in FIG. 4. In the example of FIG. 5, four optical transmission lines 18a, 18b, 18c, and 18d are formed independently of each other at the location of an optical fiber of the optical connection trunk line 18. In actuality, the four optical transmission lines 18a, 18b, 18c, and 18d can be formed by sending signals of the optical transmission lines 18a, 18b, 18c, and 18d sequentially through four time-divisional communication channels. It is naturally possible to employ another method; for example, plural communication channels can be secured at the same time by sending plural optical signals having different wavelengths through the same optical fiber.

In the example of FIG. 4, it is possible to prevent each of the communication relay 12 and 22 from becoming complex because the four independent optical transmission lines 18a-18d are formed in the optical connection trunk line 18. That is, pieces of information transmitted by the four systems of communication lines 11-1 to 11-4 can be sent, as they are, to the four respective systems of communication lines 21-1 to 21-4 via the corresponding systems of optical transmission lines 18a-18d. It is not necessary to perform special processing such as mixing plural systems of signals in the communication relay 12 or separating plural systems of signals from a signal received by the communication relay 22.

<Example Arrangement of Communication ECUs of Vehicular Network Device on Vehicle>

Figure 6:
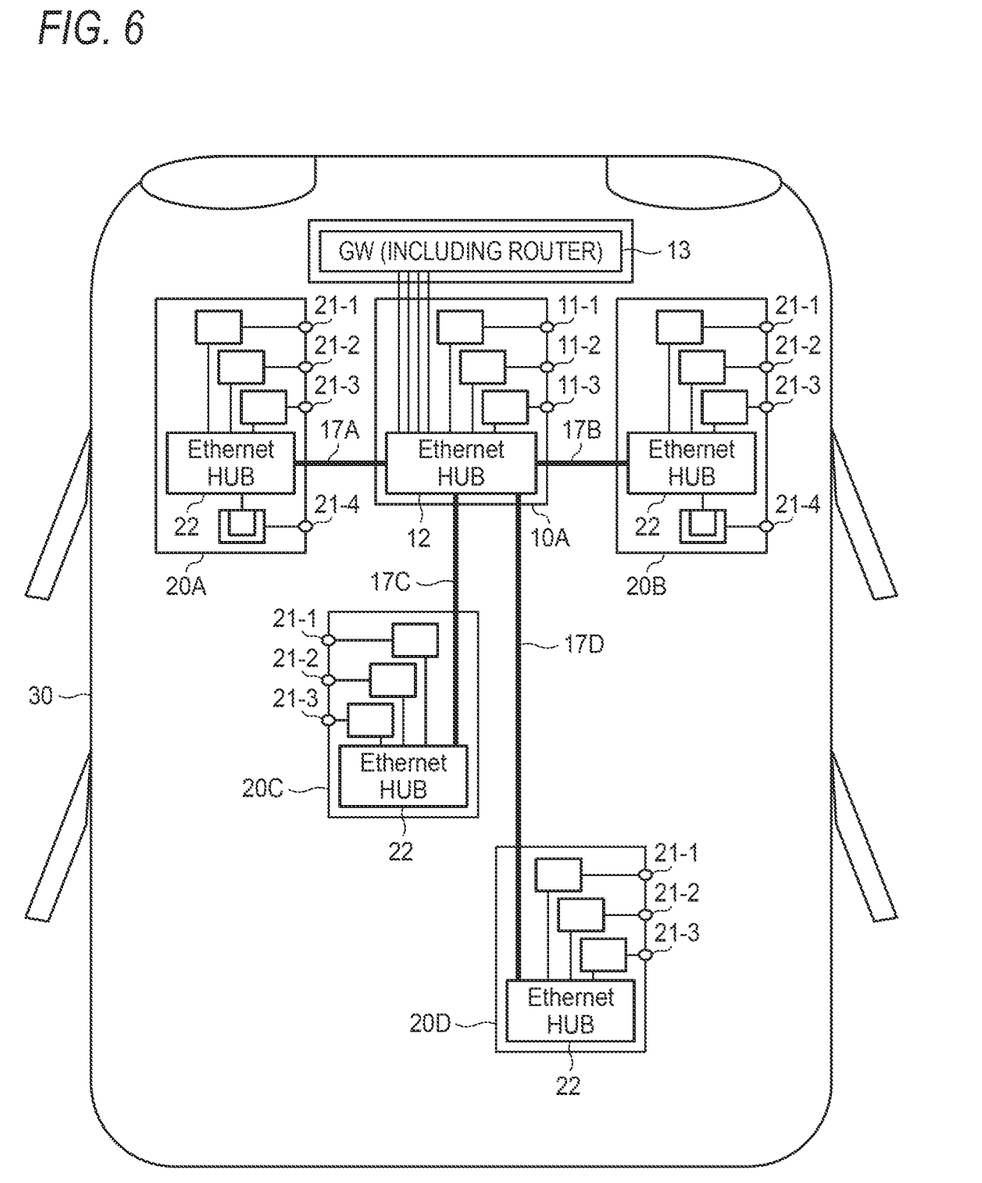
FIG. 6 is a block diagram showing an example arrangement of communication ECUs of a vehicular network device on a vehicle.

FIG. 6 shows an example arrangement of communication ECUs of a vehicular network device on a vehicle 30. The vehicular network device shown in FIG. 6 includes one communication ECU 10A having a gateway (GA) function and four communication ECUs 20A, 20B, 20C, and 20D not having a gateway function. The total number of communication ECUs 20A-20D connected to this network is increased or decreased as necessary.

The five communication ECUs 10A, 20A, 20B, 20C, and 20D are arranged in different areas on the vehicle 30. In a typical example, the communication ECUs 10A, 20A, 20B, 20C, and 20D are disposed in the engine compartment, in the vicinity of the left door, in the instrument panel, in the vicinity of the right door, and in the luggage room, respectively. Naturally, they may be disposed in other areas such as an area in the vicinity of the vehicle body roof, an area in the vicinity of the seats, and areas in the vicinities of the bumpers.

In the example of FIG. 6, the communication relay 12 of the communication ECU 10A and the communication relay 22 of the communication ECU 20A are connected to each other by an interarea connection unit 17A. Likewise, the communication relay 12 of the communication ECU 10A and the communication relay 22 of the communication ECU 20B are connected to each other by an interarea connection unit 17B. The communication relay 12 of the communication ECU 10A and the communication relay 22 of the communication ECU 20C are connected to each other by an interarea connection unit 17C. The communication relay 12 of the communication ECU 10A and the communication relay 22 of the communication ECU 20D are connected to each other by an interarea connection unit 17D.

Like the interarea connection unit 17, each of the interarea connection units 17A, 17B, 17C, and 17D has four systems of independent communication lines. In the example of FIG. 6, each of the communication relay 12 and the communication relays 22 is designed so as to be compatible with the Ethernet standard.

The communication ECU 10A is the same in configuration as the communication ECU 10 shown in FIG. 1 except a change that the former is configured so that the plural interarea connection units 17A, 17B, 17C, and 17D can be connected to its communication relay 12. Each of the communication ECUs 20A-20D is the same in configuration as the communication ECU 20 shown in FIG. 1.

Each of various vehicular devices (electric devices such as ECUs; not shown) disposed at respective locations of the vehicle 30 can communicate with another vehicular device over the network by connecting the former to one of the plural systems of communication lines 11-1 to 11-4 of the communication ECU 10A or one of the plural systems of communication lines 21-1 to 21-4 of one of the communication ECUs 20A-20D.

Each of various vehicular devices that is connected to one of the plural systems of communication lines 11-1 to 11-4 or one of the plural systems of communication lines 21-1 to 21-4 can receive all signals that are sent to the same communication line. For example, where the CAN communication standard is employed, by recognizing an ID included in data frames, each vehicular device discriminates data frames directed to itself from the other data frames and receives only the data frames directed to itself while discarding the other data frames. Where the Ethernet communication standard is employed, each vehicular device judges whether a destination MAC address contained in MAC frames coincides with its own one and receives only MAC frames directed to itself while discarding the other MAC frames. As a result, plural vehicular devices can be connected to each communication line having a bus structure.

Features of the vehicular network device according to the embodiment of the invention will be summarized concisely below in the form of items [1] to [5]:

[1] A vehicular network device installed on a vehicle, comprising:

a communication relay (12) which is connected to at least two sets of plural communication lines (11-1 to 11-4); and a router (13) which controls a communication route of a signal to pass through the communication relay, wherein the plural communication lines belong to respective predetermined systems and are independent of each other;

wherein when receiving a signal from a communication line of one of the at least two sets of plural communication lines, the communication relay sends the signal to a communication line, belonging to the same system as the communication line from which the signal has been received, of another set of plural communication lines and to the router; and wherein the router sends the signal to a communication line, belonging to a different system than the communication line from which the signal has been received, of the other set of plural communication lines.

[2] A vehicular network device, comprising:

plural communication relays (12, 22) which can be disposed in different areas on a vehicle;

a router (13) which controls a communication route of a signal to pass through two of the plural communication relays; and an interarea connection unit or units (17) each of which connects two of the plural communication relays to each other and one of the plural communication relays and the router to each other by a communication line; and device connection units (communication lines 11-1 to 11-4, 21-1 to 21-4) which are connected to the plural respective communication relays and each of which has plural communication lines, wherein the plural communication lines belong to respective predetermined systems and are independent of each other;

wherein the communication line of each interarea connection unit has transmission lines which are independent of each other and belong to respective systems that are at least equal in number as the plural communication lines;

wherein when receiving a signal, each of the plural communication relays outputs the signal to one, belonging to the same system as the communication line from which the signal has been received, of the transmission lines and to the router; and wherein the router sends the signal to one, belonging to a different system than the communication line from which the signal has been received, of the transmission lines.

[3] The vehicular network device according to item [2], wherein the plural communication relays (12, 22) are disposed in respective spaces in the vehicle that are provided with respective vehicle portions having different functions and are independent of each other (see FIG. 6).

[4] The vehicular network device according to item [2], further comprising a trunk line (optical connection trunk line 18) capable of higher speed communication than the plural communication lines of each of the device connection units, wherein:

the trunk line includes transmission lines (optical transmission lines 18a-18d) that are at least equal in number as the plural communication lines of each of the device connection units.

[5] The vehicular network device according to item [2], further comprising a device (security management unit 15, 25) which manages communication security and is disposed between at least one of the plural communication relays and a communication line, belonging to one system, of the associated device connection unit.

What is claimed is:

1. A vehicular network device installed on a vehicle, comprising:

a communication relay which is connected to at least two sets of plural communication lines; and a router which controls a communication route of a signal to pass through the communication relay, wherein a plural communication lines of a first set of the at least two sets belong to respective predetermined systems and are independent of each other, and a plural communication lines of a second set of the at least two sets belong to the respective predetermined systems and are independent of each other, such that a first connection line of the plural communication lines of the first set and a first communication line of the plural communication lines of the second set belong to a first predetermined system, and a second connection line of the plural communication lines of the first set and a second communication line of the plural communication lines of the second set belong to a second predetermined system;

wherein, in a first case when receiving a first signal from a communication line of the first set of plural communication lines, the communication relay sends the first signal to a communication line of the second set, belonging to the same predetermined system as the communication line of the first set from which the signal has been received;

wherein, in a second case when the communication relay receives a second signal from a communication line of the first set of plural communication lines, the communication relay sends the second signal to the router and the router sends, via the communication relay, the second signal to a communication line of the second set, belonging to a different predetermined system, of the predetermined systems, than the communication line of the first set from which the signal has been received, wherein, in the first case, the communication relay sends the first signal to both the communication line of the second set, belonging to the same predetermined system as the communication line of the first set, and to the router, wherein, in the second case, the communication relay sends the second signal to both the communication line of the second set, belonging to the same predetermined system as the communication line of the first set, and to the router, wherein, in the first case, an instance of the first signal is sent from the communication relay to the communication line of the second set, belonging to the same predetermined system as the communication line of the first set, without passing through the router, and wherein, in the second case, an instance of the second signal is sent from the communication relay to the communication line of the second set, belonging to the same predetermined system as the communication line of the first set, without passing through the router.

2. A vehicular network device, comprising:

plural communication relays which can be disposed in different areas on a vehicle, the plural communication relays including a first communication relay and a second communication relay;

a router which controls a communication route of a signal to pass through two of the plural communication relays;

an interarea connection unit that includes a communication line that connects the first communication relay and the second communication relay to each other;

a connection unit including a communication line that connects the first communication relay and the router to each other;

a first device connection unit connected to the first communication relay and having plural communication lines;

a second device connection unit connected to the second communication relay and having plural communication lines;

wherein the plural communication lines of the first device connection unit belong to respective predetermined systems and are independent of each other, and plural communication lines of the second device connection unit belong to the respective predetermined systems and are independent of each other, such that a first communication line of the plural communication lines of the first device connection unit and a first communication line of the plural communication lines of the second device connection unit belong to a first predetermined system, and a second communication line of the plural communication lines of the first device connection unit and a second communication line of the plural communication lines of the second device connection unit belong to a second predetermined system, wherein the communication line of the interarea connection unit has transmission lines which are independent of each other, belong to the respective systems, and that are at least equal in number as the plural communication lines of the first device connection unit, wherein, in a first case when receiving a first signal from a communication line belonging to the first predetermined system, the first communication relay outputs the first signal to the first communication line of the first device connection unit belonging to the first predetermined system, and the second communication relay outputs the first signal to the first communication line of the second device connection unit belonging to the first predetermined system, and wherein, in a second case when the first communication relay receives a second signal from the first communication line of the first device connection unit belonging to the first predetermined system, the router sends, via the first communication relay, the second signal to one of the transmission lines of the interarea connection unit which belongs to a different predetermined system, of the predetermined systems, than the first communication line of the first device connection unit that belongs to the first predetermined system.

3. The vehicular network device according to claim 2, wherein
the plural communication relays are disposed in respective spaces in the vehicle that are provided with respective vehicle portions having different functions and are independent of each other.

4. The vehicular network device according to claim 2, wherein
the communication line of the interarea connection unit is a trunk line capable of higher speed communication than the plural communication lines of each of the first device connection unit and the second device connection unit.

5. The vehicular network device according to claim 2, further comprising
a device which manages communication security and is disposed between at least one of the plural communication relays and a communication line, belonging to one predetermined system, of the associated device connection unit.

6. The vehicular network device according to claim 2, wherein
the plural communication lines of the first device connection unit are connected to the first communication relay in parallel at one end of the plural communication lines of the first device connection unit, and are configured to connect to at least one first device at another end of the plural communication lines of the first device connection unit, and
the plural communication lines of the second device connection unit are connected to the second communication relay in parallel at one end of the plural communication lines of the second device connection unit, and are configured to connect to at least one second device at another end of the plural communication lines of the second device connection unit.

* * * * *